(12) United States Patent
Medlock

(10) Patent No.: US 6,947,468 B2
(45) Date of Patent: Sep. 20, 2005

(54) APPARATUS AND METHOD FOR CALCULATING AND IMPLEMENTING A FIBONACCI MASK FOR A CODE GENERATOR

(75) Inventor: Joel D. Medlock, Los Gatos, CA (US)

(73) Assignee: Infineon Technologies AG, Munich (DE)

( * ) Notice: Subject to any disclaimer, the term of this patent is extended or adjusted under 35 U.S.C. 154(b) by 686 days.

(21) Appl. No.: 09/751,776

(22) Filed: Dec. 29, 2000

(65) Prior Publication Data

US 2002/0009123 A1 Jan. 24, 2002

Related U.S. Application Data

(60) Provisional application No. 60/173,631, filed on Dec. 30, 1999.

(51) Int. Cl.[7] .................................................. H04B 1/69
(52) U.S. Cl. ........................ 375/130; 375/140; 708/250; 708/252
(58) Field of Search ................................ 375/130, 140, 375/150; 341/50; 370/514; 708/252, 256, 250; 714/704; 710/50; 711/217

(56) References Cited

U.S. PATENT DOCUMENTS

| | | | |
|---|---|---|---|
| 5,926,070 A | 7/1999 | Barron et al. | |
| 6,038,577 A | 3/2000 | Burshtein | |
| 6,141,374 A | 10/2000 | Burns | |
| 6,141,669 A | 10/2000 | Carleton | |
| 6,173,009 B1 * | 1/2001 | Gu | 375/150 |
| 6,282,230 B1 * | 8/2001 | Brown et al. | 375/140 |
| 6,295,301 B1 * | 9/2001 | Asano | 370/514 |

* cited by examiner

*Primary Examiner*—Young T. Tse
*Assistant Examiner*—Edith Chang
(74) *Attorney, Agent, or Firm*—Darby & Darby

(57) ABSTRACT

An apparatus and method for calculating and implementing a Fibonacci mask for a code generator is disclosed herein. The first step receives a desired code offset from a reference code state in a Fibonacci field. Next, a field vector in a Galois field with the same code offset sought in the first field is calculated. In the next step, the first field vector is transformed into a second field vector, which is operable as a mask in the Galois LFSR. The transform step is accomplished by multiplying the Galois field vector by a linear N×N transformation matrix to obtain the Fibonacci field vector. And the N×N transformation matrix is obtained from iterated states of the Fibonacci LFSR.

2 Claims, 10 Drawing Sheets

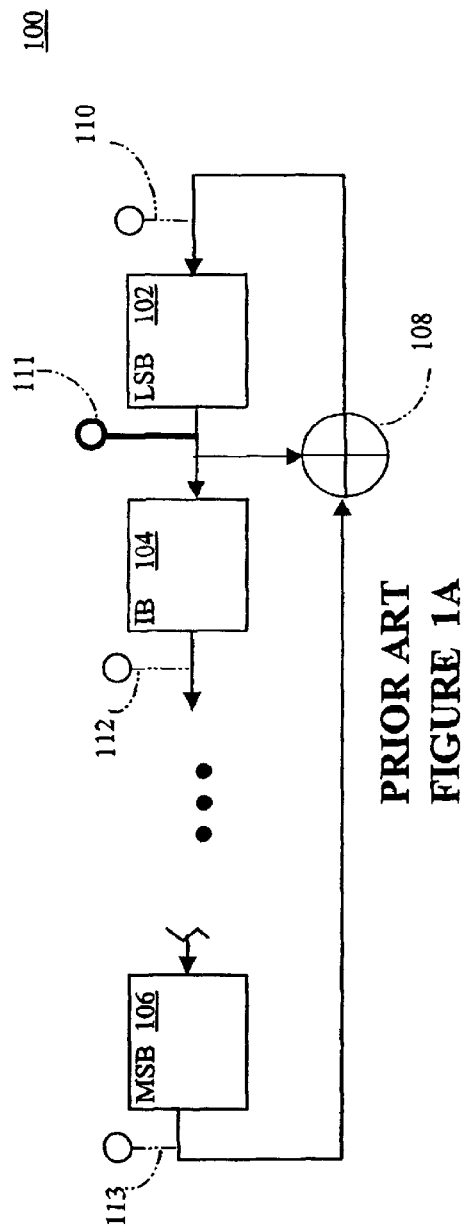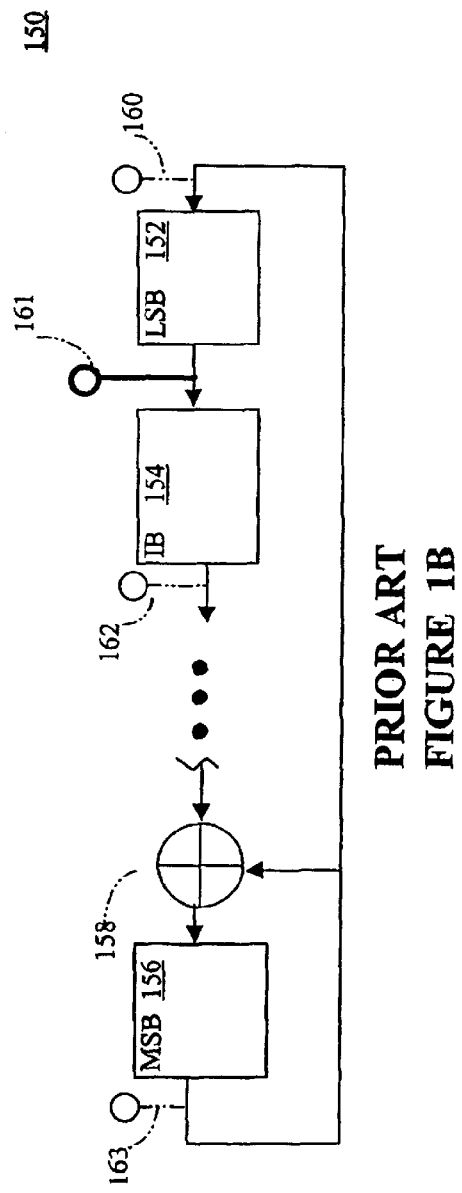

APPARATUS AND METHOD FOR CALCULATING AND IMPLEMENTING A FIBONACCI MASK FOR A CODE GENERATOR

CROSS-REFERENCE TO RELATED APPLICATIONS

This application claims priority to the provisional patent application with the following Ser. No. 60/173,631, filed on Dec. 30, 1999.

Related applications, which are incorporated herein by reference, are:
A CONFIGURABLE ALL-DIGITAL COHERENT DEMODULATOR SYSTEM FOR SPREAD SPECTRUM APPLICATIONS, Ser. No. 09/751,783;
A CONFIGURABLE MULTIMODE DESPREADER FOR SPREAD SPECTRUM APPLICATIONS, Ser. No. 09/751,785;
A FAST INITIAL ACQUISITION & SEARCH DEVICE FOR A SPREAD SPECTRUM 2p COMMUNICATION SYSTEM, Ser. No. 09/751,777;
A CONFIGURABLE CODE GENERATOR SYSTEM FOR SPREAD SPECTRUM APPLICATIONS, Ser. No. 09/751,782, now U.S. Pat. No. 6,567,017;
METHOD AND APPARATUS TO SUPPORT MULTI STANDARD, MULTI SERVICE BASE-STATIONS FOR WIRELESS VOICE AND DATA NETWORKS, Ser. No. 09/752,050; and
IMPROVED APPARATUS AND METHOD FOR MULTI-THREADED SIGNAL PROCESSING, Ser. No. 09/492,634, filed on Jan. 27, 2000
Except for application Ser. No. 09/492,634, all of the above applications are filed simultaneously herewith.

TECHNICAL FIELD

The present claimed invention relates to an apparatus and a method for calculating a mask for a linear feedback shift register (LFSR). It is particularly useful in a wireless communication system and will be described in that context.

BACKGROUND ART

Wireless communication has extensive applications in consumer and business markets. Among the many communication applications are: fixed wireless, unlicensed (FCC) wireless, local area network (LAN), cordless telephony, personal base station, telemetry, mobile wireless, and other digital data processing applications. While each of these applications utilizes spread spectrum communications, sometimes they utilize unique incompatible communication protocols, e.g., using incompatible code sequences. Consequently, each application may utilize a unique hardware, software, and methodology for generating code sequences. This practice can be costly in terms of design, testing, manufacturing, and infrastructure resources. As a result, a need arises to overcome the limitations associated with the varied hardware, software, and methodology of providing code sequences in each of the varied wireless applications.

Within the wireless cellular telephony applications, both time division multiple access (TDMA) and code division multiple access (CDMA) are popular. While a CDMA system depends heavily upon code generation functions in both the transmitter and the receiver, a TDMA system also depends upon code generation. One of the code sequences used in wireless communications is a pseudonoise (PN) sequence, so named because of its deterministic, yet noise-like characteristics. Users, or channels, are offset in phase from each other within the same PN sequence, or code space, to provide them with a unique identity. Consequently, in order to detect a user's standard PN sequence within a received signal, a need arises for a method and apparatus to advance within the code space by desired code offsets.

One popular method of generating a PN sequence is to use a Galois LFSR, also known as a multiple sequence shift register (MSSR). Unfortunately, there is no practical method of calculating a mask by which the Galois field can be advanced. A mask is a circuit utilizing a mask word of bits that selectively enables the states of an LFSR to be combined. The states that are combined result in an output from the mask that is offset in code space from the LFSR's location in code space, e.g., provides a code sequence out of the mask that is phase shifted 32 chips from the LFSR's code sequence. Prior art FIG. 1C provides an example of a mask circuit. Instead, a Galois LFSR can be advanced by recording a block of multiple code sequences in memory, wherein each sequence has a different phase offset. For example, if a PN code sequence has a length of $2^{15}$, and if a thirty-bit length of the PN sequence is desired, then approximately 15 kilobits of memory is required to store all the thirty-bit lengths located at 64 chip offsets from each other throughout the entire code space. However, memory is expensive and consumes both area and power in integrated circuit implementations. The performance of this alternative can be improved, at the cost of additional memory, by recording a finer resolution of offsets, e.g., every $16^{th}$ offset in code space. However, even with finer resolutions, if a desired code offset does not match a stored code offset, then the LFSR may have to be extensively slewed. That is, the LFSR can be sped up, or slowed down (slewed), to change its phase with respect to the incoming data stream, thereby effectively advancing or retarding the relative phase offset between the two codes. However, even this method consumes computation time and power. In view of these shortcomings, a need arises to overcome the limitations of time, accuracy, and resource-inefficiency in advancing a Galois LFSR through code space.

Referring now to prior art FIG. 1A, a block diagram of a conventional Fibonacci linear feedback shift register (F-LFSR) 100 is shown. F-LFSR 100 has a well-known construction and operation, which includes multiple memory registers each holding a state. A least significant bit (LSB) 102 is provided on the right side of F-LFSR 100, a most significant bit (MSB) 106 is provided on the left side, and an intermediate bit (IB) 104 is provided in between. The Fibonacci feedback configuration sums a state of the MSB 106 with a state from an appropriate tap, e.g., from LSB 102 for this particular configuration, via adder 108. The sum is then input as the state for LFB 102. Each time a cycle occurs, this process is repeated with the new state values in the memories of each bit. The PN sequence generated by F-LRSR 100 is received at tap location 111 in this particular configuration.

Referring now to prior art FIG. 1B, a block diagram of a conventional Galois linear feedback shift register (G-LFSR) 150 is shown. The G-LFSR has an LSB 152, an IB 154, and an MSB 156, with an inter-bit adder 158 located only between MSB 156 and the next lowest bit, e.g., IB 154. G-LFSR 150 has an output tap 161 for receiving the PN sequence in this particular configuration. G-LFSR 150 is capable of generating a mask for a Fibonacci LFSR using known methods that advance the Fibonacci LFSR through code space. However, it is not known how to use an LFSR to generate a mask for a F-LFSR. Consequently, a need arises for a method and apparatus that can generate a mask for a Galois LFSR to provide advancements through code space.

Referring now to prior art FIG. 1C, a conventional mask circuit 170 is shown. Mask circuit 170 has multiple memory registers referred to as mask registers, e.g., mask register 1 171a through mask register M 171m. The number of mask registers, M, usually matches the number of memory registers in an LFSR to which it is coupled. Thus, for example, mask circuit 170 would have M=N registers if it were coupled to F-LFSR 100 of prior art FIG. 1A. The value 'm' also refers to he number of AND gates, e.g., 172a–172m, and outputs 174a–174m coupled thereto. Inputs 110 through 113 correspond to the outputs from F-LFSR in prior art FIG. 1A. An adder 176a is provided at each gate output, except for the highest order gate 172m, wherein the results are summed from more significant bits. A final output line 178 provides the sum of the outputs from all the AND gates, 172a–172m. Mask registers 1 171a through M 171m, receive a bit of a mask word, e.g., from memory, that enables a respective AND gate. The specific mask word, and the output provided on line 178, correspond to a predetermined advance in code space. As mentioned, a mask circuit with a mask word similar to mask 170 can be applied to a F-LFSR 100 in FIG. 1A. However, there is no known method to determine a mask word for a mask circuit coupled to a G-LFSR, e.g., G-LFSR 150 of FIG. 1B. Additional detail on LFSRs, fields, and mask circuits is provided in Chapter 6 of "CMDA Systems Engineering Handbook", by Jhong Sam Lee and Leonard E. Miller. This reference is hereby incorporated by reference.

In another scenario, a communication protocol or a communication device may require the use of multiple code generators. For example, a communication protocol may require the use of both a Galois LFSR and a Fibonacci LFSR. By requiring two code advancement techniques with no apparent commonality, both individual systems must be provided. This will increase hardware size, power requirements, and resource needs. Resultantly, a need arises to overcome the limitation of hardware proliferation needed for generating code offsets for multiple LFSR configurations.

SUMMARY OF THE INVENTION

The present invention provides a solution to advance within the code space by a desired code offset. In particular, the present invention overcomes the limitations of time, accuracy, and resource-inefficiency in advancing a Galois LFSR through code space. Additionally, the present invention provides a method and apparatus that can generate a mask for a Galois LFSR to provide advancements through code space. The present invention also overcomes the limitation of hardware proliferation needed for generating code offsets for multiple LFSR configurations.

A first embodiment of the present invention provides a method for calculating and implementing a Fibonacci mask, or mask word, for a code generator. The first step receives a desired code offset from a reference code state in a Fibonacci field. Next, a field vector in a Galois field with the same code offset sought in the first field is calculated. In the next step, the first field vector is transformed into a second field vector, which is operable as a mask in the Galois LFSR. The transform step is accomplished by multiplying the Galois field vector by a linear N×N transformation matrix to obtain the Fibonacci field vector. The N×N transformation matrix is obtained from iterated states of the Fibonacci LFSR.

A second embodiment of the present invention provides an apparatus for implementing the aforementioned method. The apparatus is an electronic device, such as a workstation, having a processor and computer readable memory, coupled to each other. The electronic device is operable to implement the aforementioned steps by executing instructions and data, stored in memory, via the processor, and via other optional components in the electronic device.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

PRIOR ART FIG. 1A is a block diagram of a conventional Fibonacci linear feedback shift register.

PRIOR ART FIG. 1B is a block diagram of a conventional Galois linear feedback shift register.

PRIOR ART

DETAILED DESCRIPTION OF THE INVENTION

Figure 1C:
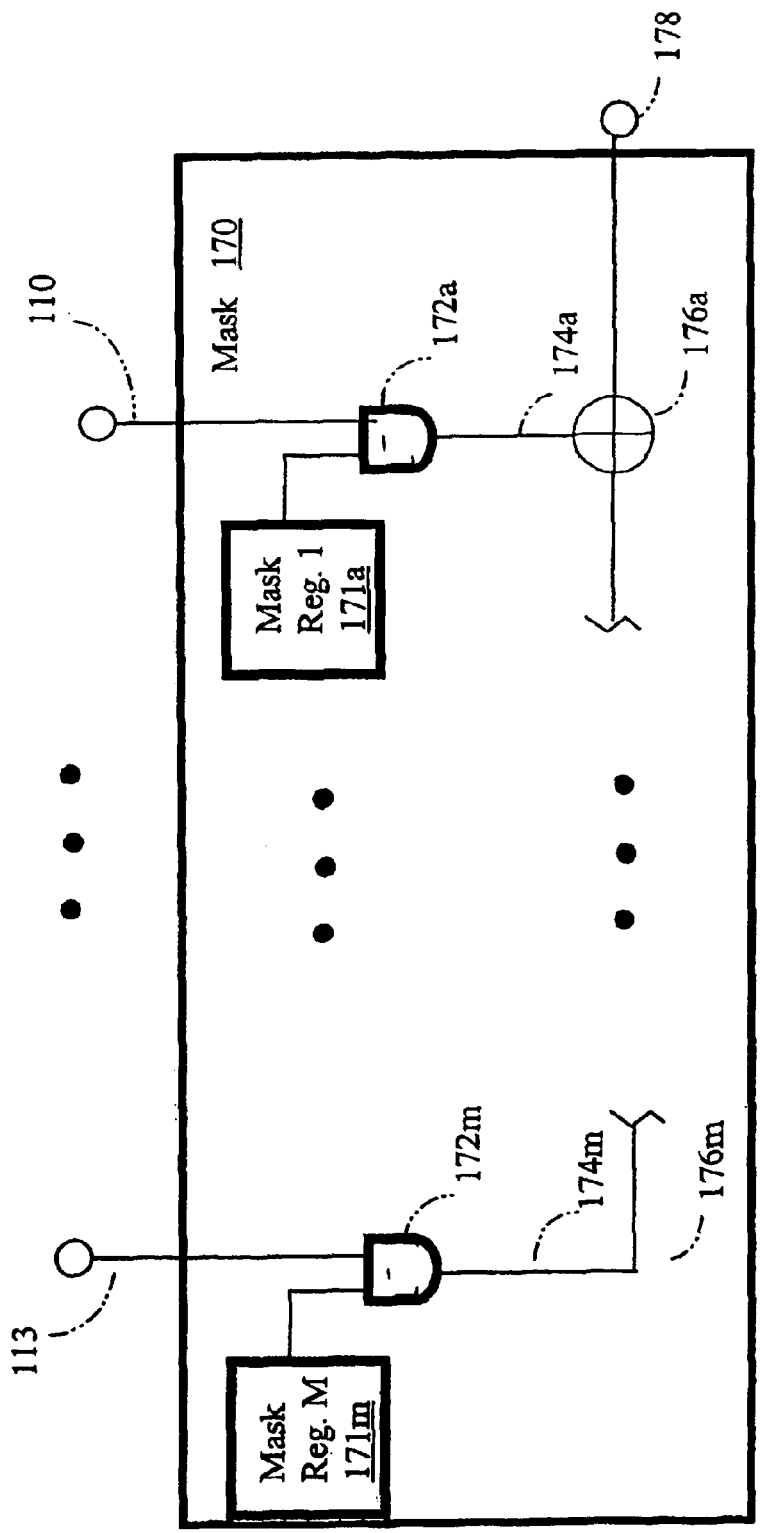
FIG. 1C is a block diagram of a conventional mask circuit.

Reference will now be made in detail to the preferred embodiments of the invention, examples of which are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital spread-spectrum wireless communication systems or techniques. These systems or techniques include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station, and to receivers, e.g., a terminal, for fixed wireless, W-LAN, cellular telephony, and personal base station applications.

In particular, one fixed wireless application to which the present invention may be applied is a metropolitan multi-point distribution system (MMDS). Examples include wireless cable broadcast, or two-way wireless local loop (WLL) systems. Some examples of a W-LAN, that can communicates digitized audio and data packets, for which the present invention can be applied include Open Air, and the Institute of Electrical and Electronics Engineers (IEEE) specification 802.11b. And in the application of unlicensed FCC applications, the present invention may be applied to specific instances such as the Industrial, Scientific, and Medical band (ISM) devices, which can include cordless telephony products. Personal base stations can utilize either cordless or cellular telephony wireless communication standards. Lastly, the cellular telephony systems in which the present invention can be applied include, but are not limited to, IS-95, IS2000, ARIB, 3GPP-FDD, 3GPP-TDD, 3GPP2, 1EXTREME, or other user-defined protocols.

Similarly, while the present embodiments utilizes a transformation matrix between exemplary Galois field and Fibonacci field, the present invention is well suited to determining and applying a transformation matrix between other types of fields. For example, any Galois field GF (2) polynomial and GF (4) polynomial or Z (4) polynomial can be utilized for the transformation. Some examples of code sequences to which the present invention can be applied include, but are not limited to: M-sequences, Gold codes, S2 codes, etc.

Figure 2:
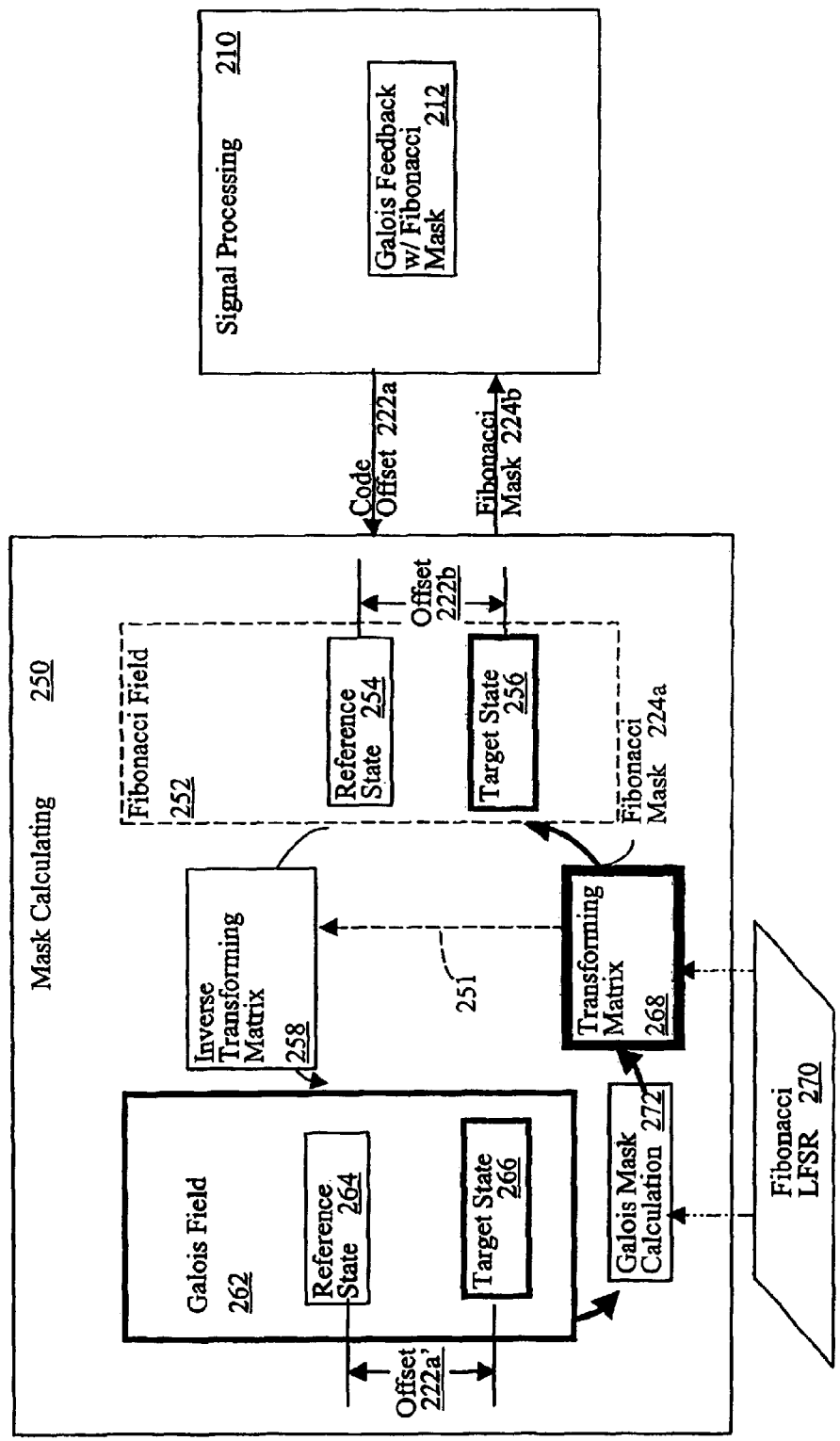
FIG. 2 is a block diagram of a functional system to generate a Fibonacci mask, in accordance with one embodiment of the present invention.

The present detailed description of the present invention begins with a description, in FIG. 2, of the functional relationships associated with the physical structure and the processes of the present invention. Then, the present detailed description section will continue with details of the physical structure and architecture of the present invention, with reference to FIGS. 3 and 4. FIGS. 5A and 5B provide exemplary matrices and vectors for the transformation matrix. Lastly, the detailed description section will describe, in FIGS. 6A–6C, the process of the present invention as steps in an exemplary flowchart.

Fibonacci Field and Galois Field

Referring now to FIG. 2, a block diagram 200 of a functional system to generate a Fibonacci mask is shown, in accordance with one embodiment of the present invention. Functional block diagram 200 illustrates how the apparatus and method described hereinafter will be utilized to generate a Fibonacci mask.

Block diagram 200 includes a signal processing function block 210 and a mask calculating function block 250. Signal processing block includes a block 212 for sequence generation via Galois feedback and via Fibonacci Mask offset. Mask calculating block 250 includes a Fibonacci vector field block 252 and a Galois vector field block 262, both of which are independent of each other. Both Fibonacci vector field block 252 and a Galois vector field block 262 can be described by a primitive element α, known by those skilled in the art. Signal processing block 210 communicates code-offset 222a to mask calculating block 250, and receives a resultant Fibonacci mask word input 224b having the desired code offset 222a. Block diagram 200 is best understood in conjunction with Table 1, which provides the output of F-LFSR 100 and G-LFSR 150 of prior art FIGS. 1A and 1B, in terms of α versus the iteration of the LFSR.

TABLE 1

Output versus Iteration of F-LFSR and G-LFSR

| Iteration | Power | Galois Field | Fibonacci Field |
|---|---|---|---|
| 0 | 1 | 1 | 1 |
| 1 | α | α | α + 1 |
| 2 | $\alpha^2$ | $\alpha^2$ | $\alpha^2 + \alpha + 1$ |
| 3 | $\alpha^3$ | $\alpha^3$ | $\alpha^3 + \alpha^2 + \alpha + 1$ |
| 4 | $\alpha^4$ | $\alpha^3 + 1$ | $\alpha^3 + \alpha^2 + \alpha$ |
| 5 | $\alpha^5$ | $\alpha^3 + \alpha + 1$ | $\alpha^3 + \alpha^2 + 1$ |
| 6 | $\alpha^6$ | $\alpha^3 + \alpha^2 + \alpha + 1$ | $\alpha^3 + \alpha$ |
| 7 | $\alpha^7$ | $\alpha^2 + \alpha + 1$ | $\alpha^2 + 1$ |
| 8 | $\alpha^8$ | $\alpha^3 + \alpha^2 + \alpha$ | $\alpha^3 + \alpha + 1$ |
| 9 | $\alpha^9$ | $\alpha^2 + 1$ | $\alpha^2 + \alpha$ |
| 10 | $\alpha^{10}$ | $\alpha^3 + \alpha$ | $\alpha^3 + \alpha^2$ |
| 11 | $\alpha^{11}$ | $\alpha^3 + \alpha^2 + 1$ | $\alpha^3 + 1$ |
| 12 | $\alpha^{12}$ | $\alpha + 1$ | α |
| 13 | $\alpha^{13}$ | $\alpha^2 + \alpha$ | $\alpha^2$ |
| 14 | $\alpha^{14}$ | $\alpha^3 + \alpha^2$ | $\alpha^3$ |

Table 1 shows the iterations and outputs of a 5 stage LFSR, e.g., either F-LFSR 100 or G-LFSR 150 of FIG. 1A and 1B, respectively. Both F-LFSR 100 and G-LFSR 150 are represented by the polynomial of equation [1] which defines a unique sequence of length $L=2^N-1$. The variable N is the order of the filter, e.g., the number of registers in the LFSR, which in the present case is N=4.

$$g(x)=1+x+x^N \quad [1]$$

Within the Fibonacci vector field 252 is a reference state 254 and a target state 256, the difference between which represents an offset 222b. Similarly, Galois vector field 262 has a reference state 264 and a target state 266, the difference between which represents an offset 222a'. Desired code offset 222a is illustrated in a Galois field 262 as offset 222a'. A transformation by inverse matrix 258 allows a reference state 254, target state 256, or a mask representing offset 222b to be transformed from Fibonacci vector field 252 to Galois field space 262. A Galois mask calculation 272 is performed from the information, e.g., reference state 264 and offset 222a', in the Galois field 262. In a similar manner, transformation by matrix 268 allows Galois mask calculation 272 that represents offset 222a', to be transformed from Galois field space 262 to Fibonacci Field space 252 to generate a Fibonacci mask 224a. Thereafter, Fibonacci mask 224a is communicated as input 224b to signal processing block 210 for implementation in block 212 for generating a sequence via Galois feedback and via Fibonacci mask. The reference to Fibonacci mask 224 is realized by a mask word in the Fibonacci field having a bit length corresponding to the order of the LFSR for which it will be applied. Because the transform matrix allows translation between Galois field 262 and Fibonacci field 252, Galois vector-generating hardware is reused for the computation of Fibonacci vectors. Consequently, the present invention requires substantially less computational complexity needed to obtain results in both fields.

Fibonacci LFSR input 270 provides a mechanism by which a Galois mask calculation 272 and transformation by matrix 268 may be implemented. Inverse transformation matrix 258 can be generated by taking the inverse of the transformation matrix. The method and apparatus by which the transformation matrix is generated will be described in subsequent flowcharts FIGS. 6A–6B and in hardware diagrams of FIGS. 3 and 4. While the present embodiment provides an LFSR with a specific polynomial and order, the present invention is well suited to an LFSR of any polynomial and order. Additionally, while mask calculation block 250 relates a Galois field 2652 with a Fibonacci field 252, for a translation, the present invention is well suited to providing a transformation matrix between two alternative fields, e.g., an S2 to a Fibonacci field.

Apparatus for Fibonacci Mask

Figure 3:
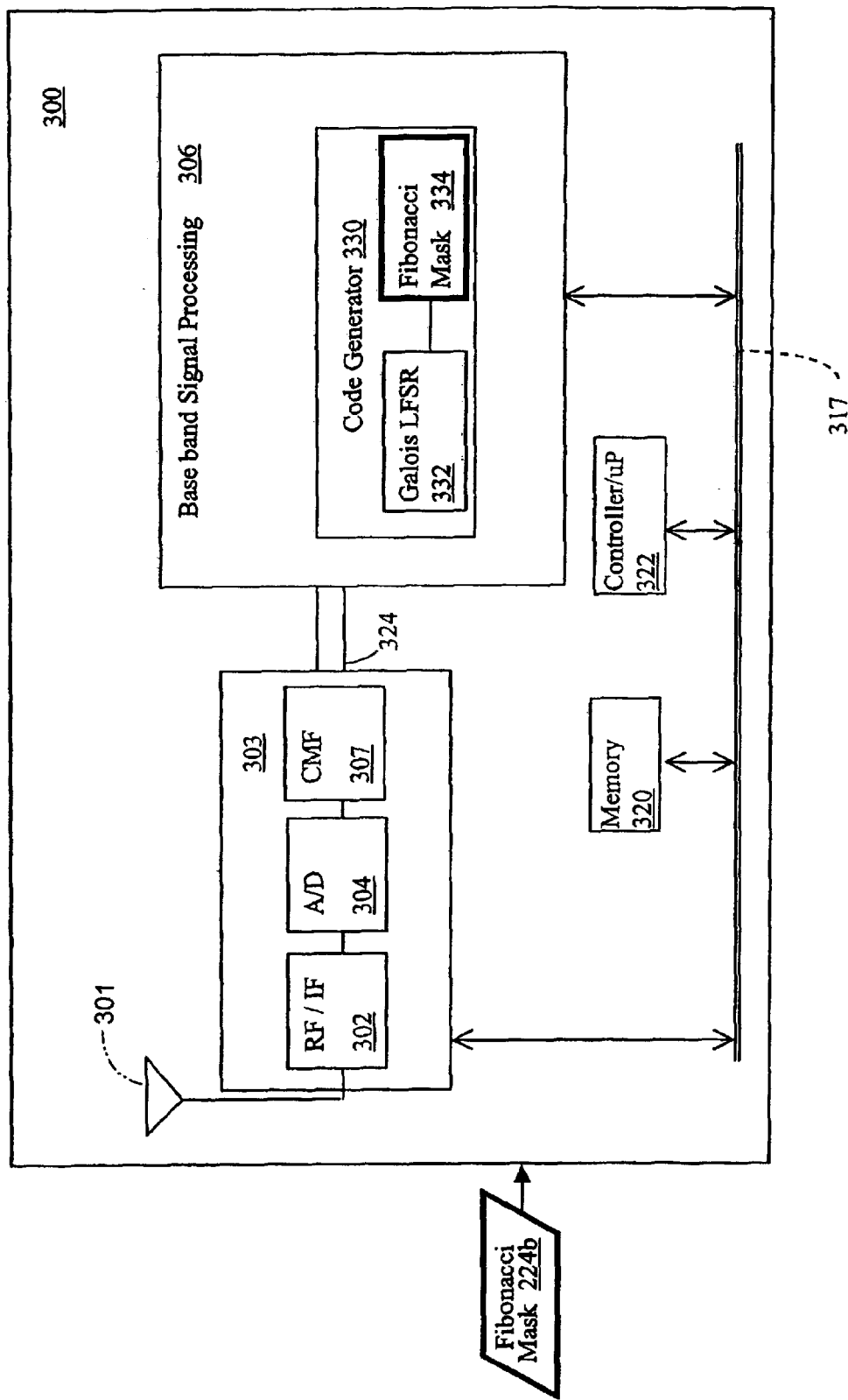
FIG. 3 is a block diagram of a communication device for implementing a Fibonacci mask, in accordance with one embodiment of the present invention.

Referring now to FIG. 3, a block diagram of a communication device for implementing a Fibonacci mask is shown, in accordance with one embodiment of the present invention. Electronic communication device 300 is a wireless code division multiple access (CDMA) base station for a cellular telephony application in the present embodiment. However, the present invention is well suited to use in a mobile handset, a test platform, an embedded wireless modem, other communication devices in the cellular telephony application, or any of the other wireless communication applications mention hereinabove. Furthermore, the present invention is applicable to any spread spectrum communication device utilizing code sequences. Communication device 300 is operable as described in a subsequent flowchart.

Communication device 300 includes a front-end processing block 303 having an antennae 301 coupled to a radio frequency/intermediate frequency (RF/IF) transceiver 302. RF/IF transceiver 302 includes components such as a voltage-controlled oscillator (VCO), known to one skilled in the art, for performing signal mixing, filtering, gain control functions, and IF translation. In turn the RF/IF transceiver 302 is coupled to an analog to digital (A/D) converter 304 that digitizes the analog signal from the RF/IF transceiver 302 into a digital signal in a reception path. A/D converter 304 is coupled to a chip-matched filter (CMF) 307 that matches the signal to a chip pulse shape suitable for subsequent processing in base band signal processing block 306. The output of CMF 307 can be a complex signal that is communicated to base band signal processing block 306 via interconnect 324. Communication device 300 also includes memory 320 and a processor (or controller) 322, coupled to a bus 317, to provide data, configuration, and instructions to the various components shown.

Communication device 300 also includes a base band processing block 306, coupled to front-end processing block 303, for processing the recovered digital signal provided by the front-end processing block 303. In turn, code generation block has a Galois linear feedback shift register (G-LFSR) 332 coupled to a Fibonacci mask block 334. In the present embodiment, Fibonacci mask block 334 is memory that stores mask coefficients for a mask circuit that implements advancement in code space. Fibonacci mask block 334 can also store multiple mask values, each representing a different advancement in code space. In this manner, a G-LFSR can be advanced for a wide range of conditions.

Mask configuration inputs 224b to communication device 300 can be designed using a computing device that has a graphical user interface (GUI) with a library of functions that allow predetermined configuration options, in the present embodiment. Additionally, communication device 300 can be programmed with Fibonacci mask input 224b in a variety of embodiments, thereby providing a significant degree of flexibility. For example, in one embodiment, configuration information is received via wired communications with a computing device, e.g., a workstation. In another embodiment, configuration information can be provided by an electronic storage medium, e.g., CD-ROM. In yet another embodiment, configuration information is received by wireless transmission from another communication device via antenna 301. Furthermore, configuration information is provided at the time communication device 300 is manufactured and/or initially programmed for operation in the field, in the present embodiment. However, in another embodiment, configuration information is dynamically implemented at a time communication device 300 is in operation in the field. Configuration information is received, processed, and implemented via processor 322 and memory 320 which communicate this information and instruction via line 317 to base band processing block 30 306. Within baseband processor, memory can control implementation of configuration information to, and operation of, code generator 330, in the present embodiment. Additional information on the design and implementation of configurations into a configurable communication device is provided in co-pending U.S. patent application Ser. No. 09/492,634, entitled "IMPROVED APPARATUS AND METHOD FOR 35 MULTI-THREADED SIGNAL PROCESSING" by Subramanian et al. This related application is commonly assigned, and is hereby incorporated by reference.

By having a true Fibonacci mask, baseband signal processing block 306 can implement a code offset in a G-LFSR with more accuracy, faster speed, and with less resources than conventional methods and apparatus. Fibonacci mask block 334 can be utilized to store masks for both real and complex portions of a code sequence. Code generator 330 can subsequently be applied to generating despreading codes, channelization codes, or any other type of code useful in communication systems.

While communication device 300 provides a specific quantity of components that are arranged in a specific configuration, the present invention is well suited to a wide range of alternatives. For example, Code generator 330 is a configurable code generator capable of generating codes for any one of multiple communication protocols. Additional detail on a configurable code generator is provided in co-pending U.S. patent application Ser. No. 09/751,782, now U.S. Pat. No. 6,567,071, entitled "A CONFIGURABLE CODE GENERATOR SYSTEM FOR SPREAD SPECTRUM APPLICATIONS" by Joel Medlock This related application is commonly assigned, and is hereby incorporated by reference.

Communication device 300 is adaptable to many wireless systems and capable of implementing many different types of communication protocols, as will be described hereinafter. Signals provided by front-end processing block 303 can be real only in an alternative embodiment, or can be M-ary configuration signal components, e.g. communicating with M symbols such as a binary case with M=2, a quaternary case with M=4, etc.

Figure 4:
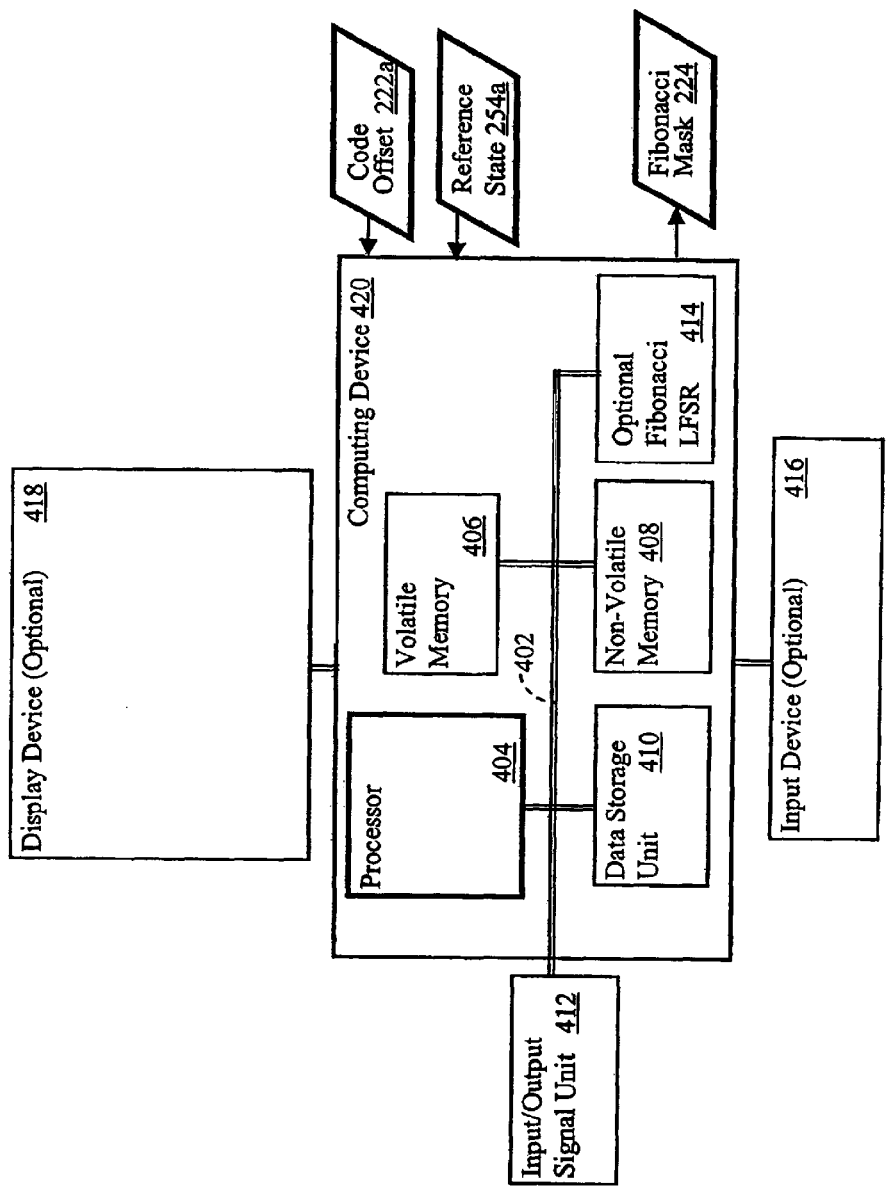
FIG. 4 is a block diagram of a computer system for generating a Fibonacci mask, in accordance with one embodiment of the present invention.
Figure 5A:
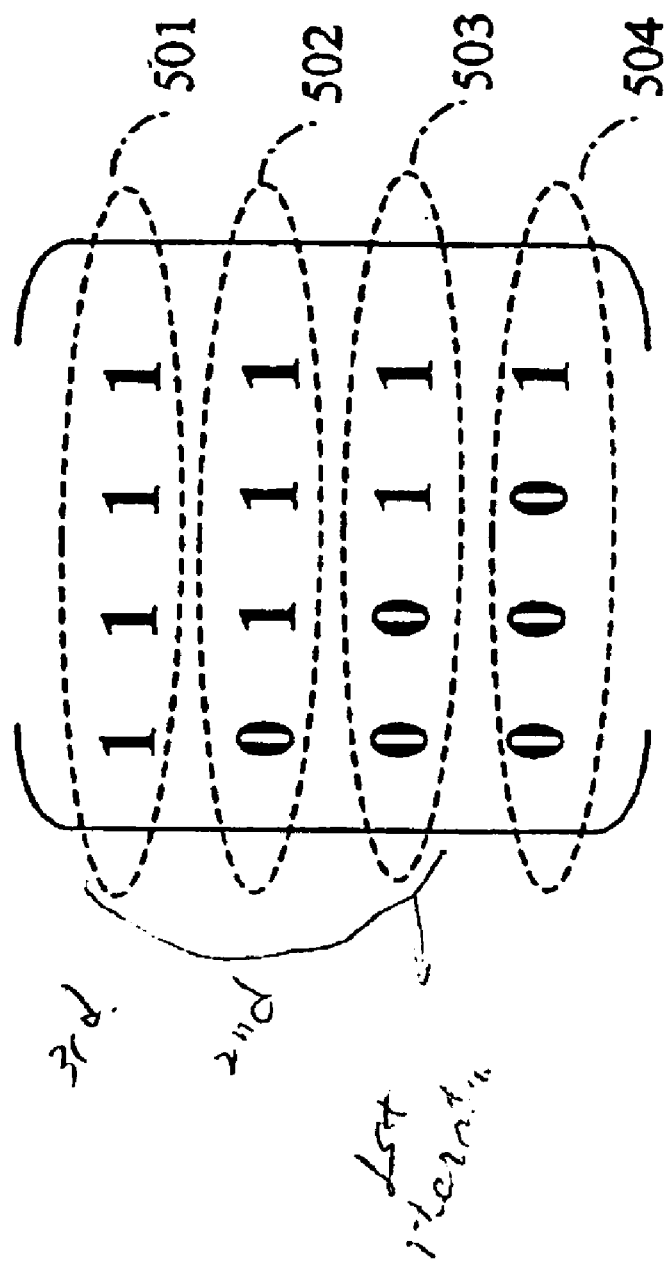
FIG. 5A is a transformation matrix for generating a Fibonacci mask, in accordance with one embodiment of the present invention.
Figure 5B:
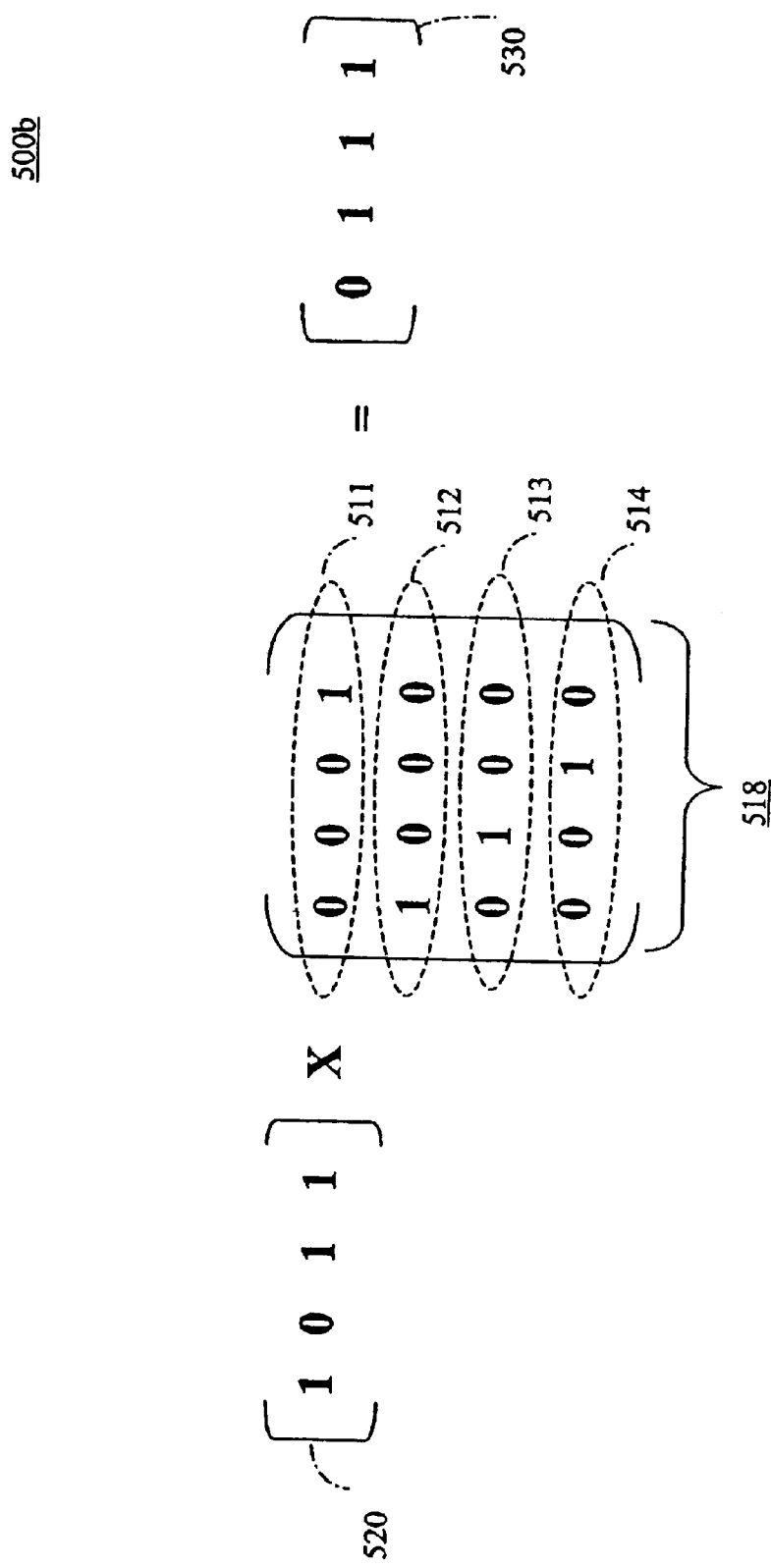
FIG. 5B is an alternative transformation matrix and equation for generating a Fibonacci mask, in accordance with one embodiment of the present invention.

Referring now to FIG. 4, a block diagram of a computer system for generating a Fibonacci mask is shown, in accordance with one embodiment of the present invention. Computer system is a workstation used for designing parameters and configurations, such as Fibonacci mask values, for a communications application such as a cellular telephony application. The operation of computer system 400 for generating the Fibonacci mask values is described in a subsequent flowchart.

Computer system 400 includes a computer block 420 that in turn has a central processor unit (CPU) 404, for processing information and instructions, and memory blocks, for storing information and instructions. Memory blocks include volatile memory unit 406, non-volatile memory unit 408, and data storage unit 410. Memory units can include random access memory (RAM) configuration for storing temporal information and permanent information or read only memory (ROM) for more permanent instructions and data. CPU 404 and memory blocks 406, 408, and 410 are all coupled via control/data bus 402 for communicating information Computer system 400 also includes an optional display device 418. Display device 418 can be any type of display, such as an analog or a digital display unit. Computer system 400 also includes an optional input device 416 coupled to bus 402. Optional input device 416 can include any input device, e.g., an alphanumeric input device such as a keyboard, or a cursor control device such as a mouse, etc. Optional input device 416 provides a communication interface between a user and system 400. An optional input/output (I/O) signal unit 412 is coupled to computing device 420 to provide communication with another device. For example, I/O unit 412 can be utilized to communication inputs 222a and 254a and output 224 to and/or from communication device 300 of FIG. 3. I/O device 412 is a hard-wired device in the present embodiment, but can be a wireless device in another embodiment.

Bus 402 provides an exemplary coupling configuration of devices in computer system 400. Bus 402 is shown as a single bus line for clarity. It is appreciated by those skilled in the art that bus 402 can include subcomponents of specific data, control, and/or status lines for the communication of commands and data between appropriate devices in computer system 400. It is further appreciated by those skilled in the art that bus 402 can be a parallel configuration, a serial configuration, and that bus 402 can include interconnects, gateways, and/or translators, as appropriate for a given application.

Computer system 400 is adapted to receive inputs such as reference state 254 and code offset 222a. Furthermore, computer system 400 is adapted to generate an output of Fibonacci mask 224 based on inputs and based on instructions and data stored in memory blocks 406, 408, and 410. Optional Fibonacci LFSR 414 is also utilized in one embodiment to realize output 224.

It is also appreciated that computer system 400 is exemplary only and that the present invention can operate within a number of different systems including a general purpose computer system, a dedicated work station, etc. Furthermore, the present invention is well suited to using a host of intelligent devices that have similar components as exemplary computer system 400. For example, computer block 420 includes an optional Fibonacci LFSR coupled to bus 402 for providing sequences by which a Galois mask can be generated.

Referring now to FIG. 5A, a transformation matrix for generating a Fibonacci mask is shown, in accordance with one embodiment of the present invention. Transformation matrix 500a is an exemplary square matrix of N×N dimensions, where N corresponds to the order of an LFSR for which a Fibonacci mask is being generated. In the present embodiment, N=4 to correspond to the exemplary fourth-order G-LFSR 150 of FIG. 1B. Transformation matrix 500a includes a first row 501, a second row 502, a third row 503, and a fourth row 504. The process of generating the particular rows within transformation matrix 500a is described in the subsequent flowcharts. Transformation matrix 500a exhibits a property sometimes referred to as an upper triangular matrix of 1's. However, depending upon the reference state, and the output tap location in the LFSR, the matrix can have a wide range of values in the rows and columns, e.g., alternative matrices are not an upper triangular matrix.

Transformation matrix 500a can be utilized in block 268 of FIG. 2 in order to convert a Galois mask calculation 272 to a Fibonacci mask 224a. If transformation matrix 500a is inverted by a link 251, then it can be utilized in block 258 of FIG. 2 in order to convert values from Fibonacci Field 252 to values in Galois field 262. The process of applying transformation matrix 500a to obtain the Fibonacci mask is also described in the subsequent flowcharts.

Referring now to FIG. 5B, an alternative transformation matrix and equation for generating a Fibonacci mask is shown, in accordance with one embodiment of the present invention. The description provided for FIG. 5A applies to the present FIG. 5B for similar elements. Transformation equation 500b includes a row vector 520, an alternative transformation matrix 518, e.g., compared to transformation matrix 500a, and a resultant row vector 530. Row vector 520 corresponds to a Galois mask, while the resultant row vector 530 corresponds to the Fibonacci mask. Transformation matrix 518 corresponds to a different tap location on an LFSR used to generate the mask. Transformation matrix 518 includes a first row 511, a second row 512, a third row 513, and a fourth row 514. The process of generating the particular rows within transformation matrix 518 is described in the subsequent flowcharts. The process of applying transformation matrix 518 to obtain the Fibonacci mask is also described in the subsequent flowcharts. Transformation matrix 500a can be substituted in transformation equation 500b to arrive at a different resultant Galois mask. The values and configurations provided in FIGS. 5A and 5B are exemplary only, as the present invention is well suited to a wide range of matrices and applications.

Processes to Generate Fibonacci Mask

Figure 6A:
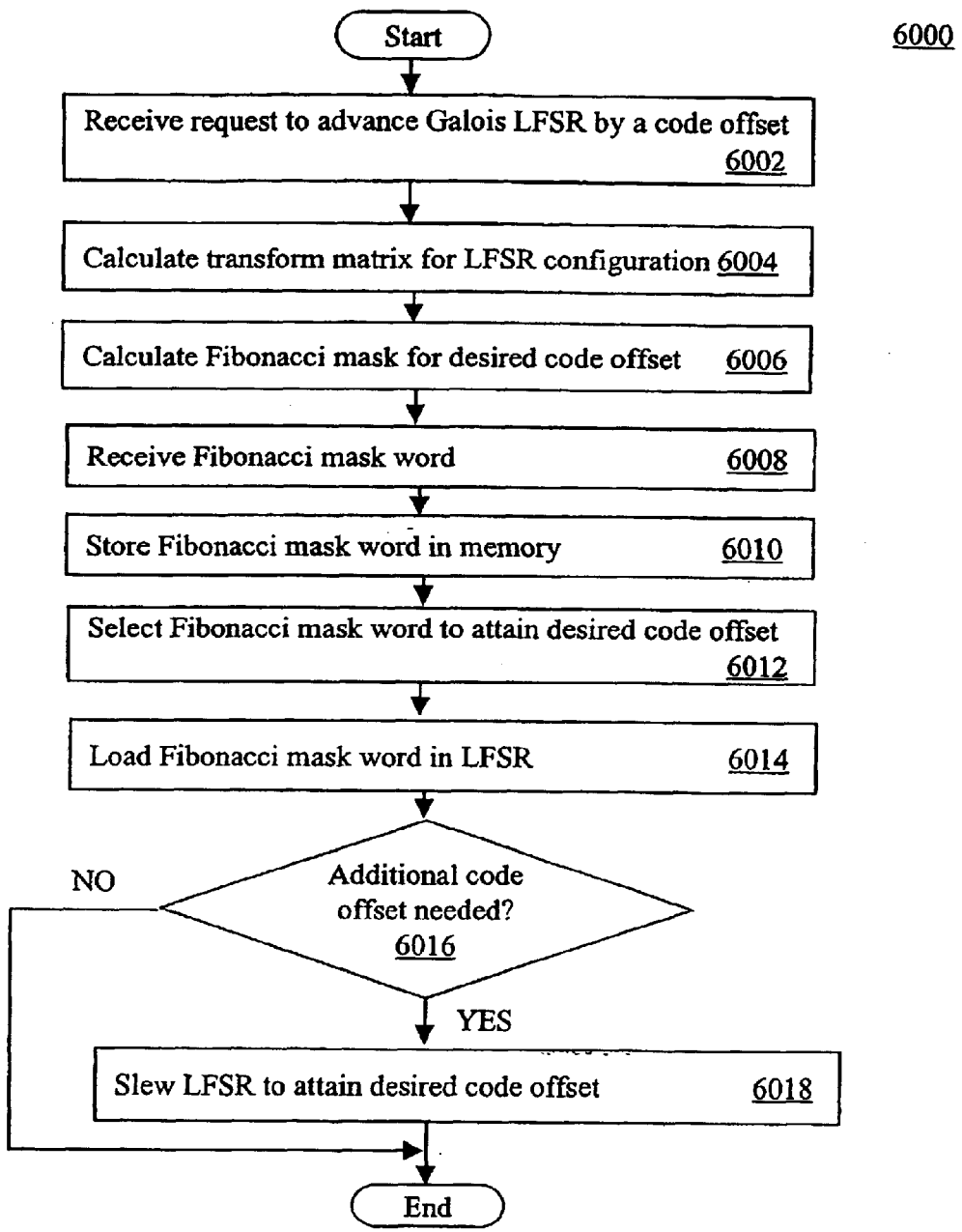
FIG. 6A is a flowchart of the process for implementing a Fibonacci mask in a communication device, in accordance with one embodiment of the present invention.

Referring now to FIG. 6A, a flowchart of the process for implementing a Fibonacci mask in a communication device is shown, in accordance with one embodiment of the present invention. By using the flowchart embodiment of the present invention, a Galois LFSR can be efficiently advanced in code space by using a Fibonacci mask. Thus, the present invention overcomes the conventional method of storing code sequences in memory, which is costly and inefficient. Flowchart 6000 is implemented, in general, using exemplary functional block diagram of FIG. 2 and using exemplary hardware block diagrams of FIGS. 3 and 4 as applied to cellular telephony application. However, the present invention is well suited to any of the aforementioned communication applications, e.g., W-LAN, cordless telephony, etc.

Flowchart 6000 begins with step 6002 in which a request is received to advance a Galois linear feedback shift register (G-LFSR) by a code offset. Code offset is determined a priori in the present invention. Step 6002 is implemented by processor 322 of communication device 300 indicating a code offset needed by communication device 300. The code offset is required in one communication protocol to identify a specific channel or user. That is, processor 322 may need to advance Galois LFSR 332 by a code offset, stored in memory, in which a user is expected to be located. Alternatively, the code offset can be determined adaptively in an electronic device, depending upon the needs of a communication application. In another embodiment, the code offset can be received from another communication device, e.g., via antennae 301. Following step 6002, flowchart 6000 proceeds to step 6004.

In step 6004 of the present embodiment, a transform matrix for the LFSR configuration is calculated. Step 6004 is implemented in one embodiment by exemplary flowchart 6100. In the present embodiment, transform matrix is calculated a priori to operation of a communication device, e.g., device 300 of FIG. 3. In this manner, the known code offsets for a given communication protocol in which device 300 is intended to operate can be determined by a remote workstation 400 with the requisite computing power. Alternatively, a communication device 300 can be provided with the appropriate computing power, instructions, and data to calculate transform matrix dynamically and locally. Following step 6004, flowchart 6000 proceeds to step 6006.

In step 6006 of the present embodiment, a Fibonacci mask word for the desired code offset is calculated. Step 6006 is implemented in one embodiment by exemplary flowchart 6200. In short, flowchart 6200 performs a matrix multiplication operation of the field vector in a Galois field by the transformation matrix in order to obtain a field vector in the Fibonacci field. The field vector in the Galois field is the Galois mask, while the field vector in the Fibonacci field is the Fibonacci mask. Similar to step 6004, the present step is implemented in computer system 400 a priori to operation of communication device 300 in the present embodiment. Following step 6006, flowchart 6000 proceeds to step 6008.

In step 6008 of the present embodiment, a Fibonacci mask word is received. Step 6008 is implemented in one embodiment, by communication device 300 receiving the Fibonacci mask word at the time the communication device is manufactured and/or initially programmed for operation in the field. The reception of the Fibonacci mask can be a one-time static step, an intermittent step, or a dynamically implemented step occurring repeatedly during the communication device's operation in the field. In one embodiment, the Fibonacci mask is received at communication device 300 from computer system 400 via wired communication, via wireless transmission, or via local installation. Following step 6008, flowchart 6000 proceeds to step 6010.

In step 6010 of the present embodiment, the Fibonacci mask is stored in memory. In particular, step 6010 is implemented in one embodiment by storing the Fibonacci mask, and its corresponding offset, in memory block 320 of communication device 300 in FIG. 3. The reference to a Fibonacci mask is realized by a mask word in the Fibonacci field. Memory may also be a memory cache local to Galois LFSR 332 in lieu of using system memory 320. With step 6010, the mask word is easily retrievable and need not be recalculated. In another embodiment, the mask word is not stored, and thus needs to be recalculated. Mask word can also be stored in memory local to code generator 330 of FIG. 3 (not shown). Following step 6010, flowchart 6000 proceeds to step 6012.

In step 6012 of the present embodiment, the Fibonacci mask word for the desired code offset is selected. Step 6012 is implemented in one embodiment by matching a desired code offset from step 6002 to the code offsets stored in memory, per step 6010. If a desired offset for a Fibonacci mask word is known to exist in memory, then steps 6004 through 6010 can be omitted. Following step 6012, flowchart 6000 proceeds to step 6014.

In step 6014 of the present embodiment, the Fibonacci mask word is loaded in an LFSR. Step 6014 is implemented in one embodiment by apparatus and methods that are known to those skilled in the art. For example, a mask circuit (not shown) is utilized as part of a Galois LFSR 332 of FIG. 3 to accept the Fibonacci mask word. In particular, a mask circuit utilizes AND logic gates coupled to the output taps from the state registers of the LFSR. Each bit of the mask word controls one of the AND logic gates, and thus one of the output taps from the LFSR. In this manner, the mask word will energize an appropriate AND logic gate to pass desired states of the LFSR that effectuate a desired code offset. In the present embodiment, AND logic gates are actually two-input transistor-based AND gates. However, depending upon the type of input signal, the AND logic gate could also be an exclusive OR (X-OR) gate. Following step 6014, flowchart 6000 proceeds to step 6016.

In step 6016 of the present embodiment, an inquiry determines whether additional code offset is needed. If no additional code offset is needed, then flowchart 6000 ends. However if additional code offset is needed, then flowchart 6000 proceeds to step 6018. Step 6016 provides the logic to compare the offset provided by a Fibonacci mask against the offset that was desired. If there is a difference, then subsequent steps are provided to satiate the desired code offset.

Step 6018 arises if additional code offset is needed after the Fibonacci mask is implemented, per step 6016. In step 6018, of the present embodiment an LFSR, e.g., G-LFSR 332 of FIG. 3, is slewed to attain the desired code offset. Step 6018 allows an LFSR to be slewed, e.g., sped up or slowed down in a manner known by those skilled in the art, in order to accurately acquire the desired code offset for a Galois LFSR. For example, if a Fibonacci mask word exists for a code offset of 50, then slewing may be necessary to reach a desired code offset of 52. Even if slewing is utilized in the present invention, the method by which the present invention advances the Galois LFSR in code space offers a substantial improvement over the conventional method described. The present invention is also well suited to using an alternative method of adjusting the state of an LFSR to achieve the desired code offset. Following step 6018, flowchart 6000 ends.

Figure 6B:
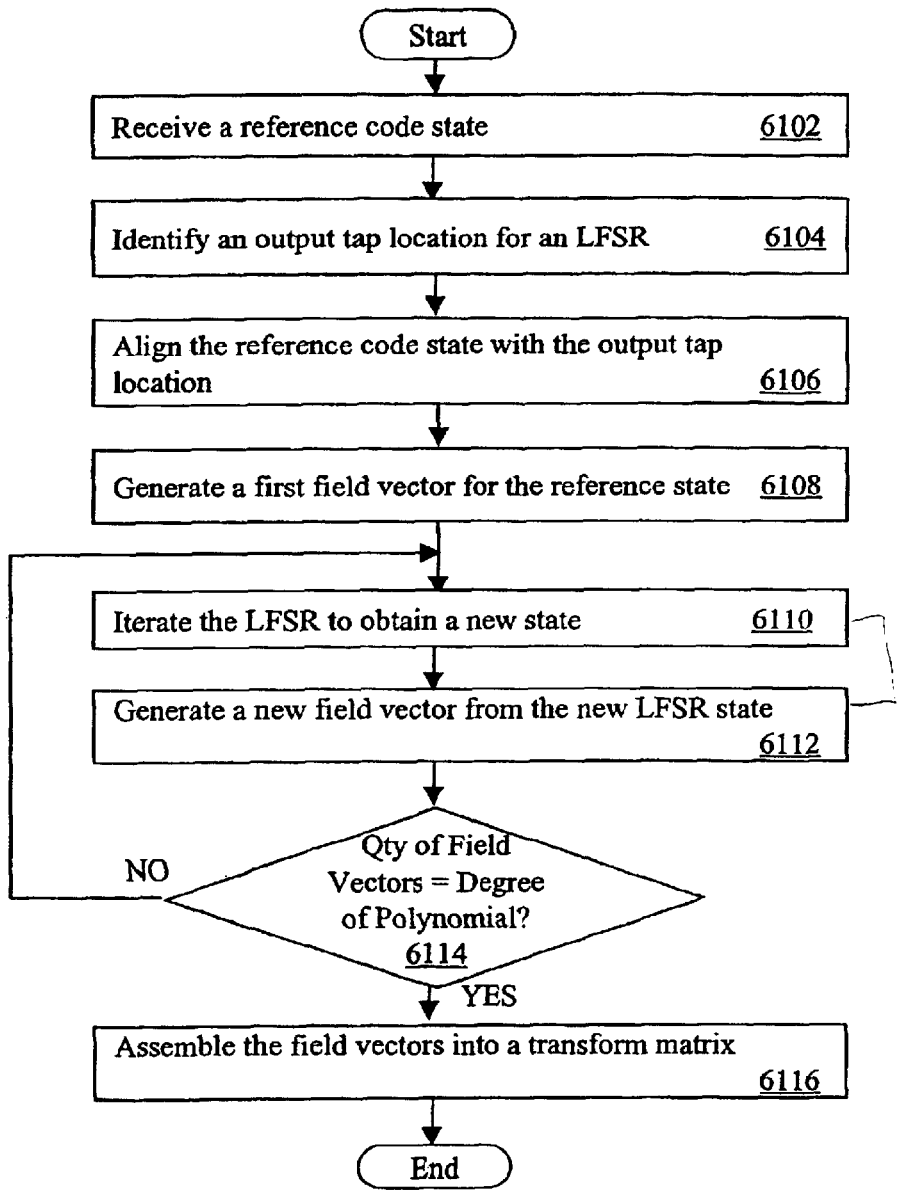
FIG. 6B is a flowchart of the process for generating a transformation matrix, in accordance with one embodiment of the present invention.

Referring now to FIG. 6B, a flowchart of the process for generating a transformation matrix is shown, in accordance with one embodiment of the present invention. By using the flowchart embodiment of the present invention, a transformation matrix is generated. The transformation matrix is utilized to translate a mask from a Galois field to a Fibonacci field, as described in Flowchart 6100 is implemented, in general, using exemplary functional block diagram of FIG. 2 and using exemplary hardware block diagrams of FIGS. 3 and 4 as applied to cellular telephony application. However, the present invention is well suited to any of the aforementioned communication applications, e.g., W-LAN, cordless telephony, etc.

Flowchart 6100 begins with step 6102 in which a reference code state is received. The reference code state is received in a code field to which a mask is desired, e.g., a Fibonacci field in the present embodiment. Step 6102 is implemented by reference code state 254 in Fibonacci field 252 of FIG. 2 because a Fibonacci mask is desired in the present embodiment. In the present embodiment, a reference code state for a nominal LFSR state is utilized. Thus, for example, iteration '0' of Table 1 described in FIG. 2 provides a nominal reference state in the Fibonacci field 252 that is "1." This state also corresponds to the reference state in the Galois field 264, as also shown as iteration '0' of Table 1.1, with the same state of "1." Thus, there is a one to one mapping of the reference code state between the Fibonacci field 252 and the Galois field 262.

However, in another embodiment of step 6102, the present invention could use any one of the reference states in Table 1 that exist in code space for a given LFSR. In this latter embodiment, an inverse transformation matrix function 258 would be utilized to transfer the reference state between Fibonacci field 252 and Galois field 262. The inverse transformation matrix function 258 can be obtained by taking the inverse of the transformation matrix function 268, a method known by those skilled in the art. The nominal code reference state could be utilized initially in order to calculate the transformation matrix function and therefrom the inverse transformation matrix function. While Table 1 and the LFSRs it represents are fourth order, the present invention is well suited to using an LFSR of any order in a similar manner. Following step 6102, flowchart 6100 proceeds to step 6104.

In step 6104 of the present embodiment, an output tap location for an LFSR is identified. Step 6104 is implemented in one embodiment by receiving input 412 at computer system 400 of FIG. 4. The output tap location is a property of the Fibonacci LFSR whose input 270 provides the sequences utilized for Galois mask calculation 272 and ultimately transformation matrix operation 268 of FIG. 2. If Fibonacci LFSR 100 of prior art FIG. 1A is utilized to provide Fibonacci LFSR input 270 of FIG. 2, then the output tap location corresponds to solid line output tap location 11. However, any tap location can be utilized for the present invention, providing that the balance of the steps reflect this location. Following step 6104, flowchart 6100 proceeds to step 6106.

In step 6106 of the present embodiment, the reference code state is aligned with the output tap location. Step 6106 is implemented in one embodiment by the tap location chosen for exemplary Fibonacci LFSR 100 of prior art FIG. 1A. For the nominal reference state of "1" chosen for step 6012, LFSR 100 would have a register state of "0001" for an output tap location of 111, that corresponds to the LSB 102. Alternatively, if the output tap of the LFSR is optional tap 112 corresponding to intermediate bit (IB) 112, then the reference code state of "1" would be aligned to an LFSR register state of "0010" as shown in row 4 514 of FIG. 5B. In yet another embodiment, if the output tap of the LFSR is optional tap 113 corresponding to most significant bit (MSB) 106, then the reference code state of "1" would be aligned to an LFSR register state of "1000." Lastly, if the output tap of the LFSR is optional tap 110, corresponding to the state provided by adder 108, then the reference code state of "1" would be aligned to an LFSR register state of "1001." Step 6106 is implemented in optional Fibonacci LFSR 414 of FIG. 4, which is a dedicated device similar to exemplary LFSR 100 of prior art FIG. 1A. Alternatively, a virtual Fibonacci LFSR may be implemented by an algorithm operating in memory 406 and processor 404. In the latter case, the output location of the virtual Fibonacci LFSR is still accounted for in step 6106. Following step 6106, flowchart 6100 proceeds to step 6108.

In step 6108 of the present embodiment, a first field vector for the reference state is generated. The first field vector for the reference state is the register state corresponding to the reference state. In the present embodiment exemplary LFSR 100 of prior art FIG. 1A with output tap 111 provides a field vector of "0001" that was generated per step 6106. Step 6108 is implemented in one embodiment by storing field vectors in memory block 406 of computer system 400 to eventually form a complete transformation matrix. Following step 6108, flowchart 6100 proceeds to step 6110.

In step 6110 of the present embodiment, the LFSR is iterated to obtain a new state. Step 6110 is implemented in one embodiment by transferring the states of the LFSR as indicated by the arrows to new registers and by combining states of select registers as appropriate for the feedback configuration of the LFSR. The implementation of step 6110 is known by those skilled in the art. Following step 6110, flowchart 6100 proceeds to step 6112.

In step 6112 of the present embodiment, a new field vector from the new LFSR state is generated. The new field vector is the register state resulting from the iteration of step 6110. Thus, by iterating exemplary LFSR 100 of prior art FIG. 1A from reference state "0001," a new register state of "0011" is obtained if LFSR utilizes output tap 111 for its sequence output, as shown in row 3 503 of FIG. 5A. Alternatively, if output tap 112 is utilized as the output from the LFSR, then step 6112 would generate a new reference state of "0100" as shown in row 3 513 of FIG. 5B. This register state is the new field vector. Following step 6112, flowchart 6100 proceeds to step 6114.

In step 6114 of the present embodiment, an inquiry determines whether the quantity of field vectors equals the degree of the polynomial. If the quantity of field vectors does equal the degree of the polynomial, then flowchart 6100 proceeds to step 6116. Alternatively, if the quantity of field vectors does not equal the degree of the polynomial, then flowchart 6100 returns to step 6110. In this latter embodiment, flowchart 6100 will provide a third field vector of "0111" and a fourth field vector of "1111," for FIG. 5A, after which step 6114 will establish that the quantity of field vectors is four which equals the degree of the polynomial, e.g., equation [1] which represents the order of the LFSR. Step 6114 provides the logic to determine whether the transform matrix has been filled. In one embodiment, step 6114 is implemented by processor 404 and memory 406 of computer system 400 in FIG. 4 that compare the quantity of field vectors generated from steps 6108–6112 with the preset order of the Fibonacci LFSR.

In step 6116 of the present embodiment, the field vectors are assembled into a transform matrix. Step 6116 is implemented in one embodiment by assembling matrix values in any memory 406–410 of computer system 400. From the exemplary LFSR of prior art FIG. 1A, with output tap of 111, step 6116 generates exemplary matrix 500a of FIG. 5A. Row 4 504 corresponds to the field vector generated for the reference state in step 6108. Rows 3 503, 2 502, and 1 501 correspond to the first, second, and third iteration, respectively, as generated by steps 6110–6114. Alternatively, step 6116 generates an exemplary matrix of 518 in FIG. 5B for an LFSR with output tap 112.

Thus flowchart 6100 has culminated with the creation of the transformation matrix. The transformation matrix allows a mask word generated in the Galois field to be translated into the Fibonacci field. The Fibonacci mask word is then useful in advancing a Galois LFSR quickly and efficiently. Following step 6116, flowchart 6100 ends.

Figure 6C:
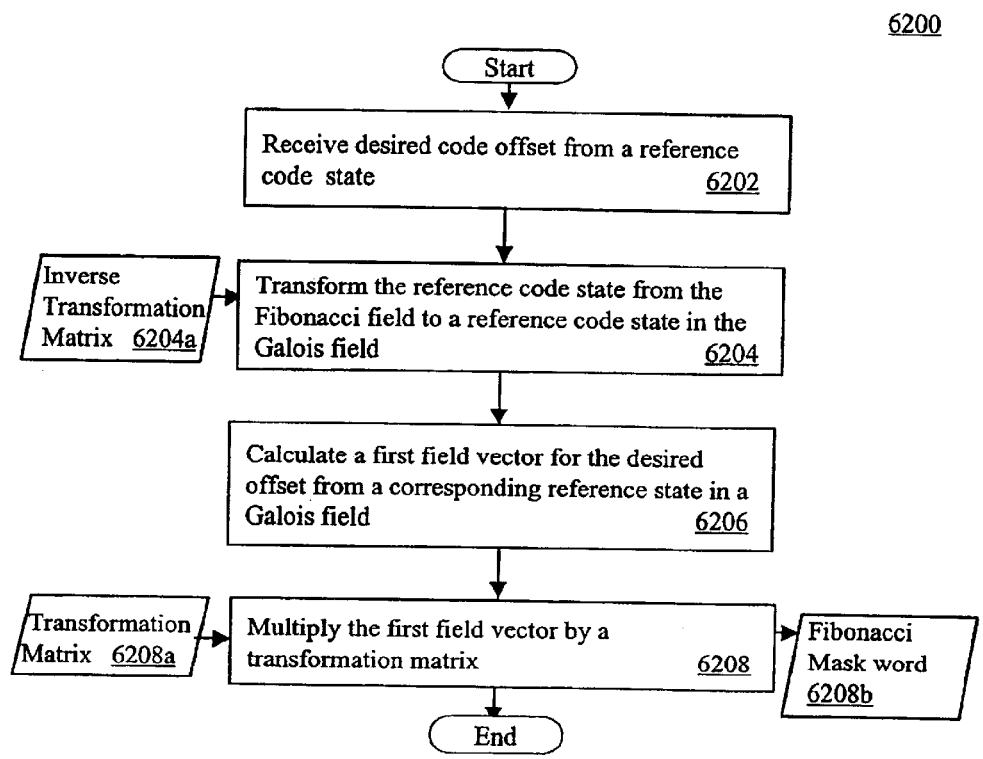
FIG. 6C is a flowchart of the process of transforming a field vector in one code field to a field vector in another code field, in accordance with one embodiment of the present invention.

Referring now to FIG. 6C, a flowchart of the process of transforming a field vector in one code field to a field vector in another code field is shown, in accordance with one embodiment of the present invention. By using the flowchart 6200 embodiment of the present invention, a Fibonacci mask can quickly and efficiently be calculated. The Fibonacci mask is thereafter useful for advancing a Galois LFSR through code space in an efficient manner and without the limitations of excessive memory requirements in the conventional method. Flowchart 6200 is implemented, in general, using exemplary functional block diagram of FIG. 2 and using exemplary hardware block diagrams of FIGS. 3 and 4 as applied to cellular telephony application. However, the present invention is well suited to any of the aforementioned communication applications, e.g., W-LAN, cordless telephony, etc.

Flowchart 6200 begins with step 6202 in which a desired code offset from a reference code state in a Fibonacci field is received. Step 6202 is implemented in one embodiment by receiving code-offset 222a at computer system 400 of FIG. 4. Code offset 222a is the offset in the Galois field 262 that represents the relative offset in code space that the Galois LFSR function 212 in signal processing block 210 desires to be advanced. Following step 6202, flowchart 6200 proceeds to step 6204.

In step 6204 of the present embodiment, the reference code state is transformed from the Fibonacci field to a reference code state in the Galois field. The reference code state 254 of Fibonacci field 252 is matched to the reference code state 264 of Galois field 262 of FIG. 2 in order to establish Fibonacci LFSR input 270 that drives the calculation of the Galois mask 272 and transformation matrix 268. If the reference code state is the nominal case of "1," then an inverse transformation matrix is not necessary to translate it into the new field. Thus, this relationship is usually a constant for a given system, e.g., mask calculating system 250 of FIG. 2.

However, if the reference code state is not the nominal case of "1," then an inverse transformation matrix is necessary to translate it into the new field. Input 6204a, as determined by computer system 400, provides an optional input of inverse transformation matrix for this purpose. Descriptions provided for step 6102 regarding the reference code state are parallely applicable to the present step of 6202. Once a mask is determined for a given code offset, it will advance an LFSR from any possible register state in code space by the amount of the code offset. Thus, the least complicated reference state possible is utilized in the present embodiment for computing the mask. Because of this property, mask-calculating block 250 does not need an input of reference state from signal processing block 210. Rather, reference state values 254 and 264 are a synchronizing factor only needed in mask calculating block 250. Following step 6204, flowchart 6200 proceeds to step 6206.

In step 6206 of the present embodiment, a first field vector for the desired offset from a corresponding reference state in a Galois field is calculated. The first field vector is the Galois mask word that will advance a Fibonacci LFSR by the desired code offset, e.g., 222a. Step 6206 is implemented in one embodiment by using an LFSR, e.g., optional F-LFSR 414. Alternatively, step 6206 is implemented by techniques that manipulate the field vectors via a processor 404 and memory 406 of computer system 400. Both of these techniques are known by those skilled in the art. Step 6206 is implemented in one embodiment to provide a first field vector, e.g., a Galois mask, of 520 as shown in FIG. 5B. Following step 6206, flowchart 6200 proceeds to step 6208.

In step 6208 of the present embodiment, the first field vector is multiplied by a transform matrix. Step 6208 thus receives a transformation matrix 6208a, e.g., from memory 406 of FIG. 4. The multiplication by a transform, via processor 404 and memory 406, can be referred to as a linear transformation and it results in a second field vector. The first field vector is the Galois mask word calculated in step 6206. The second field vector exists in the Fibonacci field, per the transformation, and represents the Fibonacci word mask output 6208b. The Fibonacci word mask will be used by Galois LFSR 332 of FIG. 3 by the desired code offset 222a. Because of the transform matrix allows translation between Galois field 262 and Fibonacci field 252, Galois vector-generating hardware is reused the computation of Fibonacci vectors. Consequently, the present invention requires only half the computational complexity needed to obtain results in both fields. Step 6208 is implemented in one embodiment by transformation equation 500b of FIG. 5B. In particular, first field vector 520 is multiplied by transformation matrix 518 to obtain a field vector 530 in the second field, e.g. Fibonacci field. FIG. 5B provides an exemplary embodiment of the present invention, which is well suited to a wide range of sizes and values, as determined by the present flowcharts. Following step 6208, flowchart 6200 ends.

Notation and Nomenclature

While flowcharts 6000, 6100, and 6200 of the present embodiment show a specific sequence and quantity of steps, the present invention is suitable to alternative embodiments. For example, not all the steps provided in flowcharts 6000, 6100, and 6200 are required for the present invention. In particular, flowchart 6000 provides steps 6010 for a storing a Fibonacci mask word in memory. However, storing step 6010 is not required in the present invention. Thus, this step may be omitted in one embodiment. Similarly, other steps may be omitted depending upon the application. In contrast, the present invention is well suited to incorporating additional steps to those presented, as required by an application, or as desired for permutations in the process.

Lastly, the sequence of the steps for flowcharts 6000, 6100, and 6200 can be modified depending upon the application. Thus, while flowcharts 6000, 6100, and 6200 are shown as a single serial process, they can also be implemented as a continuous or parallel process. For example, is appreciated that flowchart 6100 can be repeated for the multiple hardware kernel planes, e.g., plane 301a of FIG. 3C, in the multiple processors, e.g., processors 102a and 102b of FIG. 1A, within a communication device, e.g., device 100a.

Many of the instructions for the steps, and the data input and output from the steps, of flowcharts 6000, 6100, and 6200 utilize memory and processor hardware components, either on a workstation, e.g. memory 466 and 468, and processor 464, per FIG. 4C. The memory storage used to implement the flowchart steps in the present embodiment can either be permanent, such as read only memory (ROM), or temporary memory such as random access memory (RAM). Memory storage can also be any other type of memory storage, capable of containing program instructions, such as a hard drive, a CD ROM, or flash memory. Similarly, the processor used to implement the flowchart steps can either be a dedicated controller, an existing system processor, or it can be a dedicated digital signal processing (DSP) processor, as appropriate for the type of step. Alternatively, the instructions may be implemented using some form of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "calculating," "transforming," "multiplying," "iterating," "generating," "assembling," "aligning," "repeating," "providing," "identifying," "selecting," "slewing," "storing," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments presented herein, the present invention effectively provides a solution to advance within the code space by a desired code offset. In particular, the present invention overcomes the limitations of time, accuracy, and resource-inefficiency in advancing a Galois LFSR through code space. Additionally, the present invention provides a method and apparatus that can generate a mask for a Galois LFSR to provide advancements through code space. And the present invention overcomes the limitation of hardware proliferation needed for generating code offsets for multiple LFSR configurations.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. In an electronic device having a processor coupled to a computer readable memory for implementing steps, a method of calculating a transform matrix for transforming a field vector from a second field to a field vector in a first field, the method comprising the steps of:

a) receiving a reference code state chosen for the first field;
   b) generating a first field vector of the reference code state;
   c) iterating a linear feedback shift register (LFSR) state from the first field vector to form a new LFSR state;
   d) generating a new field vector from the new LFSR state;
   e) assembling the first field vector and the new field vector into the transform matrix, the assembling step comprising the steps of:
      e1) providing the first field vector as the bottom row in the transform matrix;
      e2) providing the new field vector as the next highest row in the transform matrix; and
      e3) repeating providing step e2) a total of N−2 times for a total of N rows in the transform matrix, wherein N is an integer greater than or equal to 2; and
   f) repeating steps c) and d) a quantity of N times, wherein N is a degree of a polynomial defining the first field and the second field.

2. An electronic device for generating a mask for a linear feedback shift register (LFSR), the electronic device comprising;

a processor;
   a computer readable memory unit coupled to the processor, the computer readable memory unit containing program instructions stored therein that, when executed via the processor, implements a method of calculating a transform matrix for transforming a field vector from a second field to a field vector in a first field, the method comprising the step of:
      a) receiving a reference code state chosen for the first field;
      b) generating a first field vector of the reference code state;
      c) iterating an LFSR state from the first field vector;
      d) generating a new field vector from the new LFSR state;
      e) assembling the first field vector and the new field vector into the transform matrix, the assembling step comprising the steps of:
         e1) providing the first field vector as the lowest row in the transform matrix;
         e2) providing the new field vector as the next highest row in the transform matrix; and
         e3) repeating providing step e2) a total of N−2 times for a total of N rows in the transform matrix, wherein N is an integer greater than or equal to 2; and
      f) repeating steps c) and d) a quantity of N times, wherein N is, a degree of a polynomial defining the first field and the second field.

* * * * *

UNITED STATES PATENT AND TRADEMARK OFFICE
CERTIFICATE OF CORRECTION

PATENT NO. : 6,947,468 B2  Page 1 of 1
DATED : September 20, 2005
INVENTOR(S) : Joel D. Medlock It is certified that error appears in the above-identified patent and that said Letters Patent is hereby corrected as shown below:

Column 1,
Line 17, delete "DESPREADER" and insert -- DESFREADER --.
Line 32, after "2000" insert -- . --.

Column 3,
Line 13, delete "he" and insert -- the --.
Line 29, delete "CMDA" and insert -- CDMA --.

Column 8,
Line 57, delete "6,567,071" and insert -- 6,567,017 --.
Line 59, after "Medlock" insert -- . --.

Column 9,
Lines 22-23, after "information" insert -- . --.

Column 17,
Line 63, delete "claim" and insert -- Claim --.

Column 18,
Line 40, delete "step" and insert -- steps --.
Line 60, after "is" delete ",".

Signed and Sealed this

Eighteenth Day of April, 2006

JON W. DUDAS
*Director of the United States Patent and Trademark Office*